United States Patent [19]
Fleming et al.

[11] Patent Number: 5,164,591
[45] Date of Patent: Nov. 17, 1992

[54] RADIOACTIVE TRACER WELL LOGGING UTILIZING BROMINE

[75] Inventors: Elizabeth A. Fleming, Houston; Richard V. Rivera, Stafford; Jay C. Postlewaite, Houston, all of Tex.

[73] Assignee: Shell Oil Company, Houston, Tex.

[21] Appl. No.: 756,665

[22] Filed: Sep. 9, 1991

[51] Int. Cl.$^5$ .......................... G01V 5/00; G21G 4/00
[52] U.S. Cl. ..................................... 250/260; 250/256
[58] Field of Search ............... 250/260, 299, 256, 303; 166/252

[56] References Cited

U.S. PATENT DOCUMENTS

| | | | |
|---|---|---|---|
| 3,894,584 | 7/1975 | Fertl | 166/250 |
| 4,007,366 | 2/1977 | Wiley et al. | 250/260 |
| 4,421,982 | 12/1983 | Potter et al. | 250/260 |
| 4,817,713 | 4/1989 | Nguyen et al. | 166/252 |
| 4,857,234 | 8/1989 | Gant et al. | 250/260 |

Primary Examiner—Constantine Hannaher
Assistant Examiner—Richard Hanig
Attorney, Agent, or Firm—Del S. Christensen

[57] ABSTRACT

Radioactive tracer well logging has typically utilized iodine as a source of gamma rays. Bromine-82 is utilized as the source of gamma radiation in this process. Because bromine-82 emits more energetic gammas and more gammas per decay, less activity is required. Because bromine has a shorter half-life and has less of a tendency to concentrate in a human's thyroid gland than iodine, consequences of incidental releases are less severe.

9 Claims, No Drawings 5,164,591

RADIOACTIVE TRACER WELL LOGGING UTILIZING BROMINE

FIELD OF THE INVENTION

This invention relates to radioactive tracer well logging.

BACKGROUND OF THE INVENTION

Carbon dioxide is often injected into oil-producing formations as a miscible flood drive to enhance removal of oil. Although such a carbon dioxide flood can greatly increase the amount of oil which can be recovered from a formation, it is a relatively expensive process. Carbon dioxide is usually recovered from other formations, or removed from natural gases. The carbon dioxide must be compressed and transported to the field into which it is to be injected. The carbon dioxide must therefore be utilized efficiently to result in an economical flooding operation. The efficiency with which the carbon dioxide is being utilized is indicated by the profile in which the carbon dioxide enters the formation. Fingering or channeling of the carbon dioxide, which indicate inefficiency, may be inferred when carbon dioxide enters a formation from a wellbore through some casing perforations disproportionally. These problems can often be remedied when they are detected. These problems are typically detected by determination of the velocity profile within the injection well borehole. Changes in wellbore velocities, along with the wellbore pressure profile and diameter can be utilized to determine the amount of carbon dioxide entering the formation from perforations at different locations.

A common well logging technique to determine the velocity profile within a carbon dioxide injection well involves placing a plurality of radiation detectors within the wellbore, injecting a radioactive isotope, and measuring the time required for the radioactive isotope to travel from the first radiation detector to subsequent radiation detectors. Iodine-131 has been used almost universally as the radioactive source in this well logging. Iodine-131 is readily available as a byproduct from reprocessing of nuclear fuels. But iodine concentrates in thyroid glands of humans, so acceptable human exposure levels are extremely low. The half-life of iodine-131 is also relatively long, about eight days. An isotope which has a shorter half-life would considerably lessen the exposure of personnel to radiation from equipment and from any flow of injected fluids back to the surface.

U.S. Pat. No. 4,421,982 discloses the use of bromine-82 as a preferred isotope for radioactive well logging, along with a downhole injector apparatus. Bromine-82 has a half-life of about one and a half days. This patent discloses using bromide in a granular form. The granular radioactive tracers are utilized to determine the location and extent of fractures between wellbores. For velocity profiling in a carbon dioxide injection well, a tracer component which is miscible in the carbon dioxide is preferred. Being miscible in the carbon dioxide would ensure that the tracer travels at the same velocity as the carbon dioxide. Removal of residues of the radioactive tracer from the wellhead and downhole equipment is also enhanced by the tracer being miscible with the injected carbon dioxide.

It is also desirable to have a tracer which is miscible with the injected carbon dioxide to ensure that the tracer does not plate out onto wellhead and tracer injection equipment. Applicant has found that ionic bromine-82, such as ammonium bromide, will precipitate from supercritical carbon dioxide and plate out on the well logging and wellhead equipment. Although useful velocity profile information can be obtained, injection and logging equipment are contaminated with precipitated bromine-82 and storage in isolation until an acceptable level of radiation is obtained is required.

It is therefore an object of the present invention to provide a method to determine velocities within a carbon dioxide injection well utilizing a radioactive tracer wherein the tracer is miscible in the carbon dioxide, wherein the radioactive isotope has a relatively short half-life, and wherein the tracer does not tend to plate out onto the wellhead and logging equipment.

SUMMARY OF THE INVENTION

These and other objects are accomplished by a method to determine carbon dioxide velocities within a carbon dioxide injection well comprising the steps of:

bombarding a composition comprising ammonium bromide with neutrons to form an ammonium bromide-82 containing composition;

mixing the ammonium bromide-82 with an excess of alkyl halide selected from the gap consisting of alkyl iodide and alkyl bromide in an alcohol solvent to form an alkyl bromide-82-containing solution;

placing a plurality of gamma detectors within the wellbore at known positions;

injecting a portion of the alkyl bromide-82-containing solution in the stream of carbon dioxide being injected;

measuring the time required for the alkyl bromide-82 to travel from each gamma ray detector to the next gamma ray detector within the wellbore; and determining the average velocity within the well borehole between the gamma detector locations considering the known distances between gamma detectors and the measured time lapses.

The preparation of the radioactive tracer and the determination of velocities by this method results in the benefits typically associated with velocity logging utilizing radioactive tracers, with a system which does not tend to contaminate the injection facilities and wellhead. This method utilizes a radioactive tracer which, due to a maximum permissible concentration for releases to unrestricted areas of about 1000 times that of the most commonly utilized prior art isotopes, is considerably easier to safely handle. Due to this tracer's relatively short half-life, it has considerably less potential to be a source of contamination upon exiting the formation than the most commonly used prior art isotopes. Although the bromine-82 has a relatively short half-life, this half-life is sufficiently long to permit production at a central location and commercial transportation to most carbon dioxide injection facility locations without losing an excessive amount of the initial activity.

DETAILED DESCRIPTION OF THE INVENTION

Radioactive tracer velocity logging is well known and many oil field service companies are capable of and experienced in performing these logs. Holmes Wireline Service of Odessa, Tex., and Pro Log, located at Denver City, Tex., have performed such well logging.

Velocity profiles may be determined utilizing radioactive tracers by the well known velocity-shot method, the timed-runs method, or the differential injection method. Each of these methods is described in *Surface Operations in Petroleum Production, I*, by Chilingarion et al., pp. 380-83 (1987).

The velocity-shot method is preferred in the present invention due to its relative simplicity. In the velocity-shot method, a radioactive slug is injected into a flow of fluids being injected into a formation through an injection well. By recording the time necessary for the tracer to reach gamma ray detectors within the wellbore, the average velocity between detectors can be determined. If h is the distance between detectors, A is the cross-sectional area within a casing, and t is the difference in time for the tracer to traverse the distance between the detectors, then the flow rate $\alpha$ can be determined from:

$$\alpha = \frac{hA}{t}$$

Radioactive tracer logging of the present invention utilizes a bromine-82 tracer. The bromine is in the form of an alkyl bromide. Bromide-82 is prepared by bombarding ammonium bromide with neutrons, producing the bromine-82 isotope in the form of an ionic salt, and then reacting the salt with an excess of alkyl halide in an alcohol solvent to produce an alkyl bromide. The alkyl bromide is miscible with supercritical carbon dioxide whereas the bromide salt is not. The bromide salt would therefore precipitate when injected into a stream of carbon dioxide. Although useful velocity logging data can be obtained with salts such as these, injection equipment can become contaminated with the radioactive salt precipitate. The contaminated equipment must be isolated while the radioactive material decays. The procedure to produce the alkyl bromide results in a residual amount of ionic bromide-82 in equilibrium with the alkyl halide. This equilibrium amount does not have to be separated from the tracer composition due to its small amount. It is present in a minor amount due to the large excess of alkyl halide. The molar ratio of alkyl halide to ammonium bromide is preferably in excess of about $10^9$:1.

Use of the ammonium salt of bromine is critical in the present invention. The nitrogen and hydrogen atoms of the ammonium ion will also receive neutrons as a result of the neutron bombardment. Nitrogen-14, the predominate isotope, becomes nitrogen-15, which is stable, and nitrogen-16, which will decay with a half-life of about 7.1 seconds, which is much shorter than that of bromide-82. Upon neutron bombardment, hydrogen may become hydrogen-2, which is a stable radionuclide. Neither hydrogen nor nitrogen will therefore produce isotopes upon neutron bombardment significantly which will affect the logging of this invention. If a sodium salt of bromine were subjected to neutron bombardment, the sodium isotope generated would decay at a rate similar to bromine-82. The decay of sodium would therefore need to be considered in analyzing well log data. Further, preparation of the alkyl bromide results in the cation remaining in solution as an ionic salt. If a cation were utilized which emitted a sufficient amount of radiation, contamination of the injection equipment by the halide salt byproduct of the preparation of the alkyl bromine-82 could occur.

The alkyl of the alkyl halide is most preferably methyl. Methyl iodide and methyl bromide readily react with ammonium bromide to form methyl bromide. Lower alkyls, including methyl, ethyl, propyl, and butyl halides are preferred for the same reason.

The alcohol solvent can be any alcohol, but is preferably a lower alcohol, such as methanol, ethanol, propanol, or butanol. These lower alcohols are excellent solvents for both the polar ammonium bromide, the alkyl halides, and are totally miscible with carbon dioxide.

The halide of the alkyl halide may be either bromide or iodide, but is preferably iodide.

The alkyl halides and alcohols need not be pure components, but may be mixtures of different types of acceptable alkyl halides or alcohols.

Bromine-82 may be obtained from many sources, including Texas A&M University and the University of Missouri.

The amount of bromine-82 that is required for a velocity profile survey is typically from about 0.5 to about 2.0 millicuries. A curie is $3.70 \times 10^{10}$ disintegrations per second. The amount of bromine-82 required varies depending upon the thickness of the oil reservoir being studied and the number of pulses utilized. The amount of bromine-82 required is about 10 percent of the amount of iodine-131 required to perform the same survey. The lower amount of bromine, compared to iodine, is due to the greater number of gamma photons emitted in each disintegration.

Bromine-82 is preferred as the radioactive source over the previously most commonly used isotope, iodine-131, due to drastically higher permissible levels of exposure, along with a much shorter half life. Bromine does not concentrate in the thyroid of a human as iodine does. Maximum permissible concentrations of bromine-82 which can be released to unrestricted areas are therefore 400 and 1000 times those for iodine-131 for air and water releases, respectively. Although bromine-82 requires careful handling due to its radioactive nature, the implications of minor releases and leaks are considerably less significant than the implications of releases of similar amounts of iodine-131. Not only are exposures to initial releases less dangerous, the shorter half-life of bromine-82 results in a considerably more rapid decay of radioactivity from any release.

The following example further describes the present invention, but in no way limits the invention.

EXAMPLES

Three velocity logs were performed. The first log utilized prior art iodine-131 as the gamma ray source. The second was performed on the same well as the first log, within one month of the first log. The second log utilized bromide-82, but the bromide-82 was not prepared according to the present invention. The bromide was bombarded as ammonium bromide, but was not converted to an alkyl bromide. The second log resulted in a velocity log which corresponded closely to the iodine-131 log, which demonstrated the usefulness of bromide-82 as a tracer. The ammonium-bromide as it was prepared for Log 2 was not an acceptable tracer because this log contaminated the injector, requiring that it be kept in isolation for about a week to prevent exposure to personnel to the contamination. The third log was performed utilizing a bromine-82 tracer prepared according to this invention. The third log resulted in an acceptable log, and the logging equipment was not contaminated.

The iodine-131 was obtained from commercial sources in the form of sodium iodine. About 15 millicuries of radioactivity was required.

The ammonium bromide-82 was obtained by neutron bombardment of ammonium bromide in a methanol solvent. About 2 millicuries of radioactivity was required to perform this log.

The alkyl bromide-82 used in Log 3 was obtained by bombarding ammonium bromide with neutrons in a methanol solvent, and then refluxing the ammonium bromide with methyl iodine at atmospheric pressure in methanol. Again, about 2 millicuries of radioactivity were required.

The procedure used for determining the velocity profile was as follows:
1. The tool configuration consisted of two scintillation detectors, both located below the ejector.
2. The recorder reported in a time drive mode. Both detectors were recording. The recorder speed was adjusted so that the two recorded peaks occur on the chart a minimum of 2 inches apart for each 5-foot interval.
3. The tools were kept stationary and a slug of radioactive material was ejected. The peak-to-peak transmit time of the slug moving from the top detector to the bottom detector was recorded.
4. Step 3 is performed first at the depth at which the intensity survey radioactive slug's velocity dropped below 3 feet per minute.
5. Moving upwards from the first shot, step 3 was repeated at about 5-foot intervals from the top to the bottom of the injection interval.
6. Calculations of the percent loss are performed using the peak-to-peak transit time between the two detectors.

Table 1 contains the percent of initial velocity as a function of depth from each log.

TABLE 1

| Well Depth (feet) | Percent of Initial Velocity | | |
|---|---|---|---|
| | Iodine-131 Tracer | Bromine-82 Tracer | |
| | Log 1 | Log 2 | Log 3 |
| 4,970 | 100 | 100 | 100 |
| 4,980 | 100 | 100 | 88 |
| 4,990 | 100 | 82 | 88 |
| 5,000 | 84 | 78 | 88 |
| 5,010 | 84 | 78 | 88 |
| 5,020 | 84 | 74 | 88 |
| 5,030 | 84 | 67 | 88 |
| 5,040 | 84 | 67 | 88 |
| 5,050 | 81 | 61 | 88 |
| 5,060 | 70 | 55 | 88 |
| 5,070 | 66 | 46 | 88 |
| 5,080 | 62 | 46 | 88 |
| 5,090 | 62 | 41 | 88 |
| 5,100 | 55 | 39 | 83 |
| 5,110 | 53 | 34 | 83 |
| 5,120 | 50 | 34 | 83 |
| 5,130 | 44 | 32 | 83 |
| 5,140 | 44 | 32 | 83 |
| 5,150 | 44 | 32 | 83 |
| 5,160 | 44 | 32 | 79 |
| 5,170 | 44 | 30 | 72 |

TABLE 1-continued

| Well Depth (feet) | Percent of Initial Velocity | | |
|---|---|---|---|
| | Iodine-131 Tracer | Bromine-82 Tracer | |
| | Log 1 | Log 2 | Log 3 |
| 5,180 | 44 | 30 | 65 |
| 5,190 | 44 | 30 | 62 |
| 5,200 | 44 | 30 | 54 |
| 5,210 | 39 | 22 | 46 |
| 5,220 | 21 | 21 | 32 |
| 5,230 | 15 | 9 | 32 |
| 5,240 | 12 | 6 | 31 |
| 5,250 | 5 | 1 | 31 |
| 5,260 | 3 | 1 | N/A |
| 5,270 | 0 | 0 | N/A |
| 5,280 | 0 | 0 | N/A |

Log 2 confirmed that bromide-82 could be used and can reproduce an iodine-131 log. Log 3 demonstrated that such a log could be performed without contaminating the logging equipment.

We claim:
1. A process to determine carbon dioxide velocities within a carbon dioxide injection well comprising:
   bombarding a composition comprising ammonium bromide with neutrons to form an ammonium bromide-82 containing composition;
   mixing the ammonium bromide-82 with an excess of an alkyl halide selected from the group consisting of alkyl iodide and alkyl bromide in an alcohol solvent to form an alkyl bromide-82-containing solution;
   placing a plurality of gamma detectors within the wellbore at known positions;
   injecting a portion of the alkyl bromide-82-containing solution in the carbon dioxide being injected;
   measuring the time required for the alkyl bromide-82 to travel from each gamma ray detector to the next gamma ray detector within the wellbore; and
   determining the average velocity within the well borehole between the gamma detector locations considering the known distances between gamma detectors and the measured time lapses.
2. The process of claim 1 wherein between about 0.5 and about 2.0 millicuries of bromide-82 are injected into the carbon dioxide.
3. The process of claim 1 wherein the alkyl halide is a methyl bromide.
4. The process of claim 3 wherein the methyl halide is methyl iodide.
5. The process of claim 4 wherein the alcohol is methanol.
6. The process of claim 1 wherein the alkyl halide is selected from the group consisting of ethyl halide, propyl halide, and butyl halide.
7. The process of claim 6 wherein the halide of the alkyl halide is iodine.
8. The process of claim 6 wherein the halide of the alkyl halide is bromide.
9. The process of claim 6 wherein the alcohol is selected from the group consisting of ethanol, propanol, and butanol.

* * * * *